June 21, 1960
S. C. WESTON, JR
2,941,665
HANDLING MECHANISM FOR TOOL ASSEMBLIES
Filed Feb. 27, 1957
3 Sheets-Sheet 1
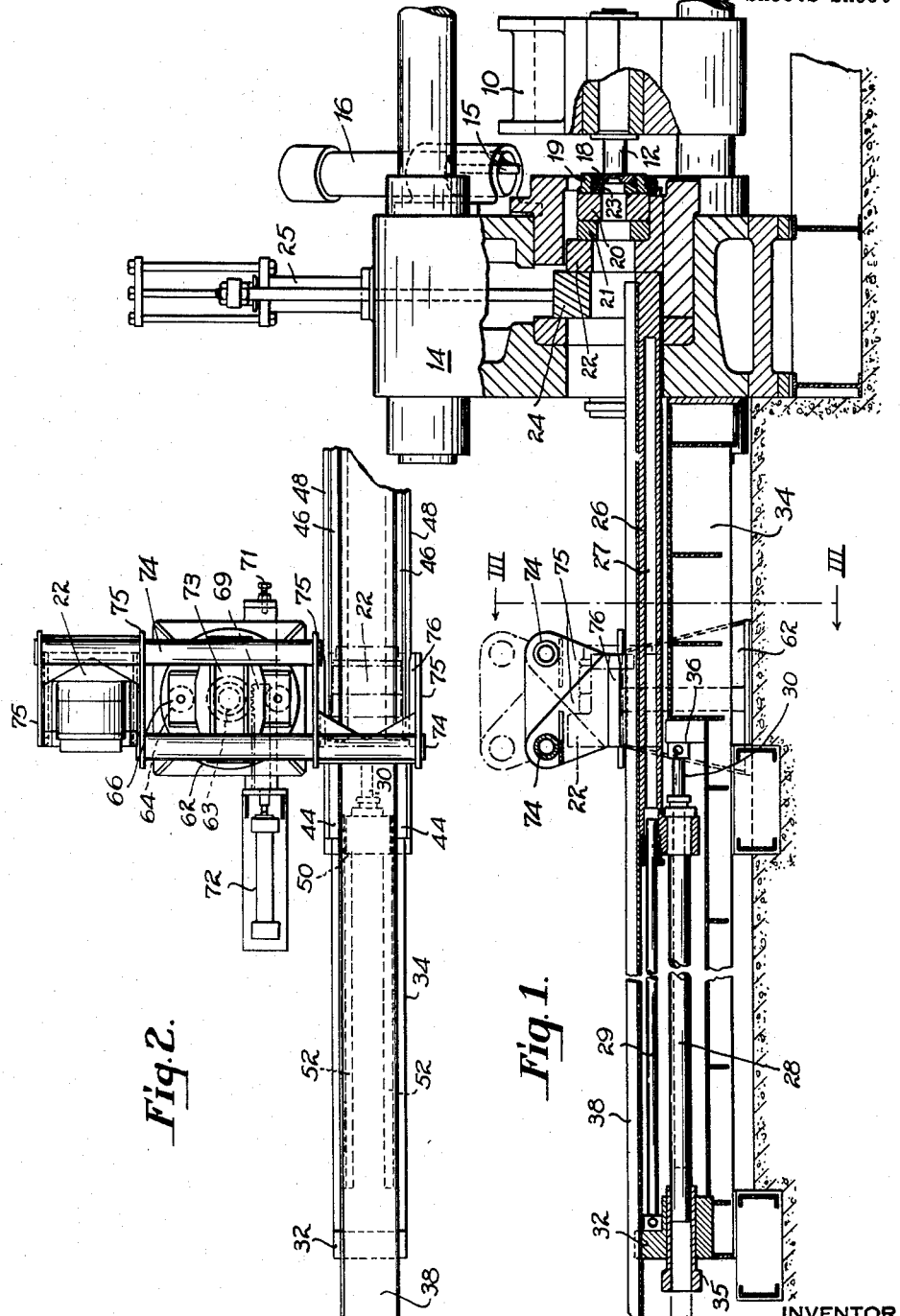
INVENTOR
Samuel C. Weston, Jr.
BY
Howard B. Funk
ATTORNEY June 21, 1960  S. C. WESTON, JR  2,941,665
HANDLING MECHANISM FOR TOOL ASSEMBLIES
Filed Feb. 27, 1957  3 Sheets-Sheet 2

INVENTOR
Samuel C. Weston, Jr.
BY
Howard B. Funk
ATTORNEY

June 21, 1960  S. C. WESTON, JR  2,941,665
HANDLING MECHANISM FOR TOOL ASSEMBLIES
Filed Feb. 27, 1957  3 Sheets-Sheet 3
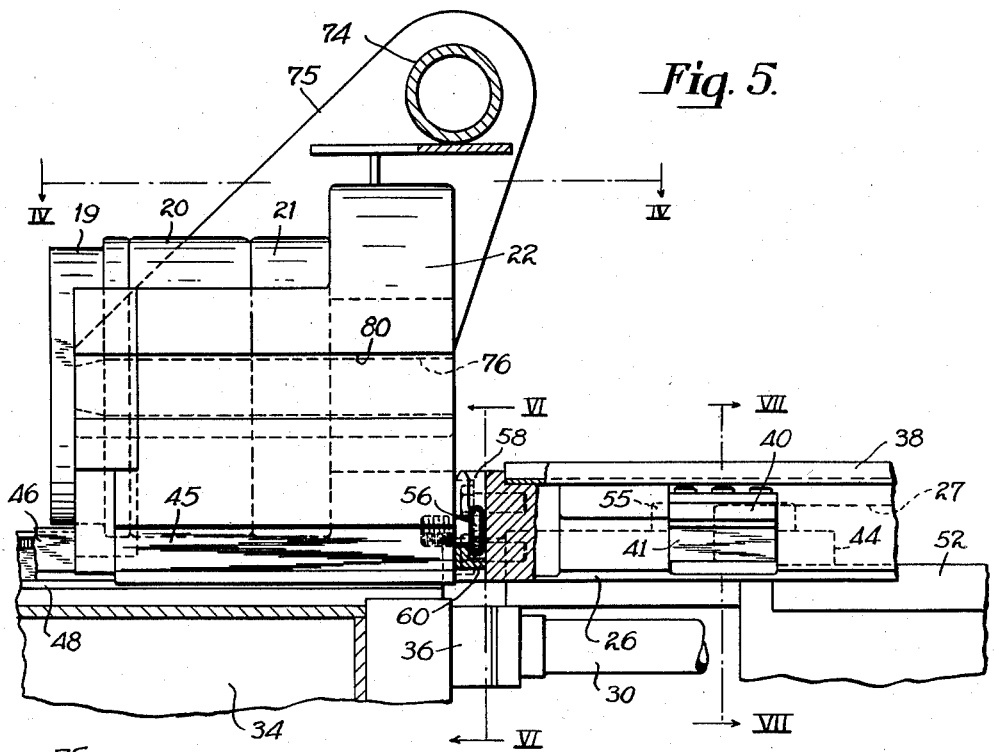
Fig. 5.
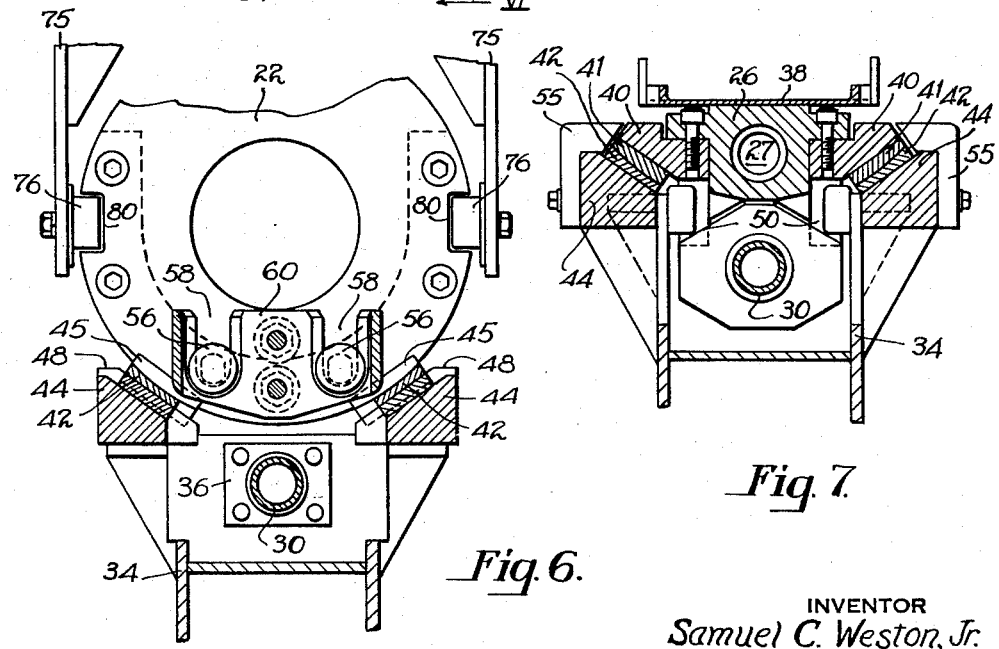
Fig. 6.
Fig. 7.
INVENTOR
Samuel C. Weston, Jr.
BY
Howard B. Funk
ATTORNEY United States Patent Office 2,941,665
Patented June 21, 1960

2,941,665

HANDLING MECHANISM FOR TOOL ASSEMBLIES

Samuel C. Weston, Jr., Pottsville, Pa., assignor to Aluminum Company of America, Pittsburgh, Pa., a corporation of Pennsylvania Filed Feb. 27, 1957, Ser. No. 642,746

5 Claims. (Cl. 207—1)

This invention relates in general to tool assembly manipulating mechanism and is more particularly concerned with handling mechanism capable of reducing non-productive lost time incident to installing and removing tool assemblies normally employed with horizontal extrusion presses.

An extrusion press of an extensively used type, to which the invention pertains, includes a longitudinally translatable tool assembly held in an operative position or location in the front platen of the press for cooperation with a billet or ingot container, and a hydraulically actuated ram for exerting pressure on the billet in the container to force the material thereof through a configuration-controlling orifice of a die supported in the tool assembly. Extremely high pressures are developed in this type of apparatus and resultant die breakage and other tool failures are occasions for moving the tools out of the press for die replacement and/or maintenance repairs, in addition to those die changes normally occurring when the production run of any one extruded shape is completed and the press requires re-tooling for production of a different extruded shape.

The tool assemblies normally employed with the extrusion equipment above described usually include a tool container in which are mounted the die and its supporting structure, which must be withdrawn from the bore in the front platen of the press to an inoperative position or location longitudinally spaced therefrom to permit access to the die, its holder and several additional elements, such as back-up members, pressure blocks, adapters, as may be required to adapt the tool container to a range of extrusion die sizes and orifice-controlling configurations. Replacement dies and their complementary supporting tool structures must be installed in the tool container before the tool assembly can be returned to its operative position within the front platen of the press and the time required for such a die change, or any repairs thereto, represents lost time at the press.

It is an object of the invention to provide means for operating a horizontal extrusion press with a minimum of non-productive time, as a result of die changing and maintenance on the dies. More particularly, it is an aim of the invention to provide means for changing the tool assembly employed with horizontal extrusion presses of the above described general type. Specifically, a purpose of the invention is to provide an extrusion press in which the tool assembly is connected to reciprocating mechanism, such as a runout table disposed adjacent the discharge side of the extrusion die, and reciprocable therewith, in combination with means for disconnecting the tool assembly from its reciprocating mechanism and removing it therefrom, whereby another tool assembly may be presented for connection to and reciprocation with the aforesaid reciprocating mechanism.

Other objects and advantages of the invention will become apparent from a consideration of the following detailed description taken in conjunction with the drawings illustrating a practical embodiment, in which:

Fig. 1 represents a partial sectional longitudinal elevational view of a horizontal extrusion press to which the invention pertains;

Fig. 2 represents a fragmentary plan view of the extrusion tool assembly handling mechanism and associated runout table;

Fig. 5 represents an enlarged sectional view taken on the line V—V of Fig. 3;

Fig. 6 represents a fragmentary sectional view taken on the line VI—VI of Fig. 5; and Fig. 7 represents a view similar to Fig. 6 taken on the line VII—VII of Fig. 5.

Figure 3:
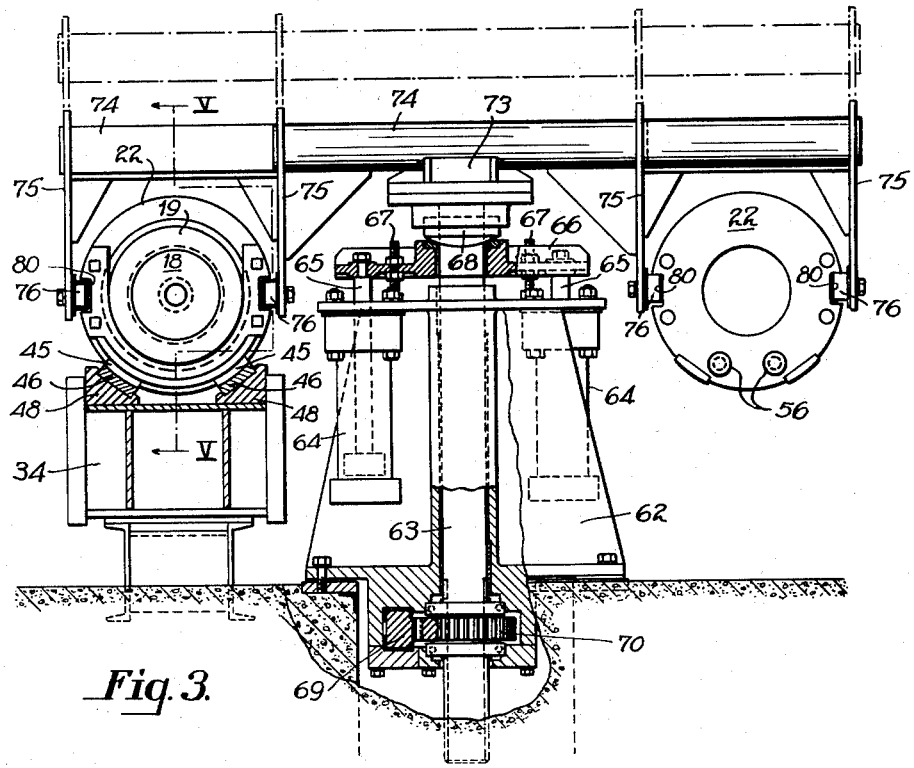
Fig. 3 represents an enlarged sectional view taken on the line III—III of Fig. 1 and showing the tool assembly in runout handling position, so as to illustrate clearly its relationship with the handling mechanism.

In Fig. 1, the billet container 10 of the extrusion press is illustrated withdrawn, as by means of pull-back piston and cylinder mechanism 12, from the press front platen 14 into position for operation of a butt shear 15, which is preferably actuated by a pressure cylinder mechanism 16 to shear an extruded shape extending through a die 18 from the unextruded material or billet heel.

The front platen 14 is provided with a central bore in axial alignment with the billet container and receives a tool assembly which includes, in addition to the die 18, a die holder 19, back-up members 20 and 21 and an adapter 23, all supported within an open top tool container 22. A gate type lock 24, movable in a vertical slot or passage provided in the platen 14, on actuation of a piston and cylinder unit 25, serves to secure the tool assembly in operative extrusion association against the thrust of billet container 10 during an extruding operation.

The extrusion press is equipped with tool assembly runout mechanism or reciprocating means for translating or reciprocating the tool container 22 and its associated die structure supported therein into and out of the respective operative and inoperative positions therefor, the latter position constituting a handling position whereat the tool assembly is bodily removed and replaced, at will, as hereinafter described. This runout mechanism is preferably hydraulically operated and, in the particular press selected for illustrating the present invention, essentially comprises a cross-head member 26 actuated by a pair of cylinders 27 and 28 in operative combination with tubular pistons 29 and 30, respectively, and a supporting frame 34 extending outwardly from the platen 14.

It will be observed that cylinder 27 is an integral part of the cross-head, and is open at its end furthest removed from the tool container. Tubular piston 29 within the cylinder 27 is anchored at its closed end at 32 to the outer end of frame 34. Pressure admitted to the interior of the tubular piston 29 adjacent its anchorage 32 reacts against the closed end of cylinder 27 and causes reciprocation of the cross-head 26 towards the front platen 14 and billet container 10. Cylinder 27 and its co-operating piston 29 actually constitute a cross-head advancing mechanism.

The cross-head 26 is translated in the opposite direction, or retracted, by means of the tubular piston 30 and cylinder 28 mechanism. In this arrangement the cylinder 28 is secured to the outer end of cylinder 27 below the axis thereof and extends through a guide 35 mounted in the outer end of frame 34. Its complementary tubular piston 30 is anchored at its closed end to an intermediate part of frame 34 at 36. Pressure admitted to the interior of the tubular piston 30 adjacent its anchorage 36 reacts against the closed end of cylinder 28 and causes reciprocation of cross-head 26 to retract the same away from the front platen 14, thereby disposing the tool assembly in its handling position shown in broken lines in Figs. 1 and 2 and in full line in Fig. 3.

Cross-head 26 supports and carries with it, during its translatory movement, a material receiving channel-shaped runout table 38 secured on the upper surface thereof. Also, to insure smooth and aligned reciprocation of the cross-head, it is equipped with laterally extending shoes 40 provided with wear plates 41 for slidable matching contact on wear plates 42 supported on rails 44 carried on the frame 34. Similar sliding contact is provided between the tool container 22 and frame 34, wear plates 45 embedded in recesses in the outer surface of the container slidingly engaging matching wear plates 46 supported on rails 48 on the frame 34. The rails 44 and 48 are aligned rails on the frame 34.

Additional translatory guiding means for cross-head 26 is preferably provided in the form of outwardly facing channel-shaped guides 50 (Fig. 7) at its rear end slidingly engaging rail bars 52 on the frame 34. Also, keeper brackets 55 secured to the frame 34 at a point in its length adjacent the retracted position of cross-head 26 act to engage the cross-head and hold it against unintentional vertical movement out of sliding contact between the wear plates 41 and 42.

Figure 4:
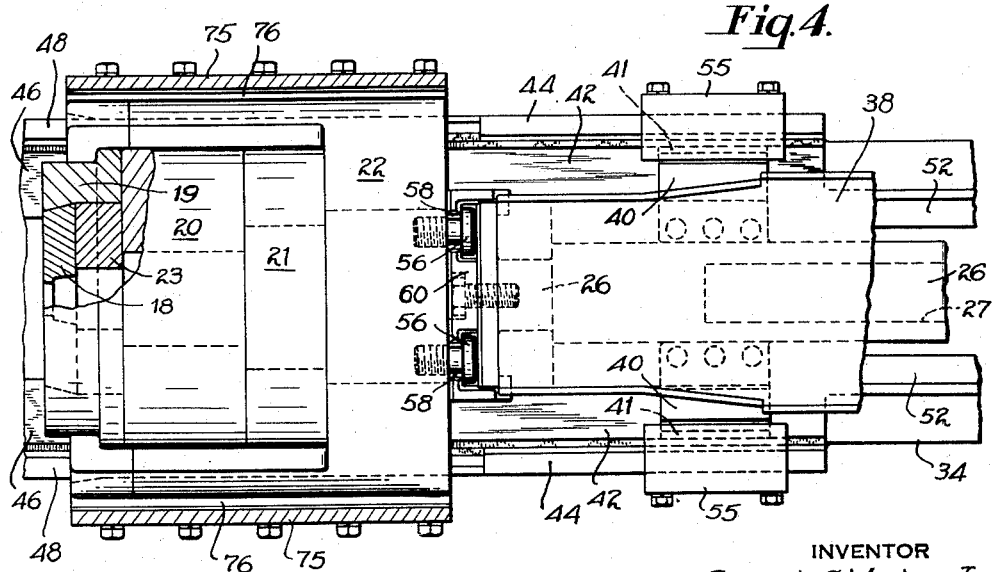
Fig. 4 represents an enlarged sectional plan view taken on the line IV—IV of Fig. 5.

In the prior art, it is customary to fixedly connect the runout mechanism cross-head 26 to its associated tool container 22 and tools supported therein. In accordance with the present invention, connection between the cross-head 26 and tool container 22 is achieved through the medium of slidably interengaging vertical shoulder means serving as a quick-release connector in the form of one or more members, such as the headed bolts 56, extending away from the tool container 22 and receivable within upwardly open shouldered slots 58 in a suitable bracket 60 secured to the forward end of cross-head 26 or closed end of cross-head advancing cylinder 27. Entrance of the heads of bolts 56 into the shouldered slots 58 is gained only from the upper surface of bracket 60, as by elevating the tool container 22 in respect to the cross-head 26 (Figs. 4, 5 and 6). It will be apparent to one skilled in the art that any connection between the tool container and cross-head that is readily releasable as a result of relative vertical movement between the so-connected instrumentalities would suffice.

The advance and improvement over the prior art includes, in addition to the above-described releasable connection, tool assembly handling mechanism for receiving and elevating the tool container 22, as well as removing it to a position out of the plane and axis of the press, where die repairs and substitutions may be made. The improved mechanism of the invention also provides for standby tool assemblies for replacing the tools so removed.

Thus, at the inoperative or handling position for the tool assembly, illustrated in broken lines in Figs. 1 and 2, and to one side of the axis of the press, a pedestal 62 is provided having a central post member 63 mounted therein for rotational and vertical movement in respect thereto. Vertical movement of the central post member 63 is preferably obtained through the medium of pressure actuated piston and cylinder units 64 dependingly supported from a plate structure permanently attached to the pedestal 62, connecting rods 65 of such units being attached to a cross-head 66 operatively connected with the central post 63 through a thrust bearing 68 and a post cap 73. It will be observed that pressure admitted to the units 64 will elevate the central post 63, adjustable stop screws 67 serving to regulate the lowermost position of the post member, as well as avoid undue impact between the pistons and cylinders of units 64.

Controlled rotation or oscillation of the central post 63 is preferably obtained by means of a rack 69 engaging with a pinion 70 slidably keyed or fixed to the lower end of the central post, a fluid motor 72 being provided to drive the rack 69. A stop member 71 (Fig. 2) is provided for limiting the arcuate turning movement of the central post 63. The thrust bearing permits turning of the post without turning of the lifting cross-head 66.

The cap member 73 is secured to the upper end of the central post 63 and serves to support a pair of laterally spaced and endwise offset horizontal members 74 which extend outwardly from opposite sides of the cap member. At their outer ends, these members 74 support dependingly mounted tool assembly engaging means or cradles, each suitably comprising a pair of spaced depending arms or plates 75 which carry opposed, inwardly facing and horizontally elongated key or rail members 76 adjacent to their lower edges. As seen in Fig. 2, only one of the members 74 reaches to the outermost plate 75 of each pair and such plate is generally triangular in outline. Each of the plates 75 is supported from the horizontal members 74 with the base marginal edge and attached rail 76 in accurate parallel relationship with the plane of reciprocation of the cross-head 26. Also, each member 74 supports a pair of the plates 75 in accurate spaced relationship to permit reciprocal entrance of a tool container 22 therebetween with the rails 76 received within longitudinal recesses or keyways 80 on the exterior surface of the tool container. As shown in Fig. 5, rails 76 and keyways 80 are coextensive with the length of the tool container to provide tool container stability when elevated, as hereinafter described. In addition, the triangular plates 75 project in opposite directions from their supporting members 74 and each pair of plates has but one supporting member extending thereacross, which construction serves to equalize the loading on the central post 63, as well as provide maximum freedom and access to a tool container 22 supported between spaced pairs of the plates, as in a die replacing operation.

In a typical operating cycle of the improved tool assembly handling mechanism of the invention, and assuming the press has been temporarily interrupted following an extrusion operation to permit die repair or replacement, the billet container 10 is backed way from the platen 14, through actuation of the pull-back cylinders 12, and butt shear 15 reciprocated or lowered, through actuation of cylinder 16, to disconnect and discard the unextruded heel of a billet remaining at the end of the extrusion operation.

Gate lock 24 is thereafter raised and pressure is admitted to cylinder 28 to translate or retract the cross-head 26, its supported runout table 38 and releasable attached tool container 22 out of extrusion position within the platen 14 to the position shown in dotted lines in Figs. 1 and 2.

In this latter position (Fig. 3) has been previously located one of the spaced pairs of depending plates 75 in the exact horizontal position at which the rails 76 carried thereby register and are received within the recesses 80 in the exterior surface of the tool container 22, thereby establishing a lift engagement or connection therewith responsively to movement of the tool assembly to its handling position. Oscillation or arcuate movement of the central post member 63, and adjustment of the stop screws 67, insure accurate alignment and registry of the recesses 80 and rails 76, each spaced pair of the plates 75 constituting a stall or cradle for a tool container 22 and the rails 76 and recesses 80, respectively, constituting underlying and overlying members forming a lifting and supporting connection between cradle and tool container. Admission of pressure to piston and cylinder units 64 elevates the central post 63 carrying with it the tool container 22, relative lifting movement of the tool container in respect to the cross-head 26 serving to slide or raise the heads of bolts 56 out of interengagement with the shouldered slots 58 and break the releasable connection therewith.

In elevated position above the axis of the press, the post 63 may now be oscillated or arcuately swung to remove the tool container 22 supported within the stall formed by one spaced pair of the plates 75 out of and to bring a second identical tool container 22 within the cradle or stall formed by the second pair of spaced plates 75 into position over the axis of the press. Lowering of the central post 63 will then interconnect the second tool assembly with the cross-head 26. Actuation of the pressure system comprising cylinder 27 and piston 29 will translate or advance the substituted tool container 22 into position within the platen 14, where it can be secured in operative extrusion position by the gate lock 24, actuated by the piston and cylinder unit 25. It will be appreciated that the substituted tool container 22 may be equipped with the same or an entirely different extrusion die and supporting elements than those initially removed from the press. Likewise, removal of the initial tool assembly within the container 22 permits maintenance or repair thereof, or substitution therefor, without any undue non-productive lost time at the press.

Modifications, substitutions and replacements of the mechanisms and parts thereof, hereinabove described, within the skill of practitioners of the art to which this invention pertains, are contemplated within the scope of the appended claims.

What is claimed is:

1. An extrusion press having a billet container and an axially translatable tool assembly in horizontal axial operative alignment with each other, a runout table connected to the tool assembly by slidably interengaging vertical shoulder means releasable by elevating the tool assembly, power means cooperatively associated with the runout table for reciprocating the same and its releasably connected tool assembly between an inoperative location outside the press and an operative location with the tool assembly sealed on the billet container, said tool assembly having longitudinal keyways at opposite sides thereof, a pedestal offset from the horizontal operative axis of the press adjacent the inoperative location of the tool assembly, a central post member arcuately and vertically movable within said pedestal, a pair of laterally spaced horizontal members supported on the said post member and extending outwardly in opposite directions therefrom and oscillatable thereby alternately into a location above and perpendicular to the runout table, a pair of laterally spaced plates at each end of said members and dependingly supported therefrom, opposed, elongated keys facing each other adjacent to the lower edges of the plates of each pair, said keys of one pair of plates being registered with and being received in said keyways of said tool assembly responsively to its movement to said inoperative location, a second tool assembly carried by the keys of the other pair of spaced plates, power actuated means mounted on said pedestal for elevating said post member to lift both tool assemblies to a plane above that of said runout table, and power means including a gear element slidably mounted on said post for turning said post member to bring said second tool assembly in its elevated position into parallelism with said runout table for lowering by descent of said post member into interconnected relation with said runout table.

2. The mechanism as defined in claim 1 wherein the said horizontal members are offset endwise with respect to each other with only one of them reaching to the outermost plate of each pair of plates, thereby providing vertical accessibility to said tool assemblies, each tool assembly including an open top tool container in which a die holder and die and back-up blocks therefor are coaxially disposed and removable vertically from the tool container.

3. The mechanism as defined in claim 2 wherein said power actuated means for elevating said post member comprises two vertical piston and cylinder units at opposite sides of said post member, each having an upwardly extending piston rod, a cross-head loose on said post member above said pedestal and attached to said piston rods, a cap member on the top of said post member and carrying said horizontal members, a thrust bearing interposed between said cap member and said cross-head through which the force to elevate said post member is transmitted, and screw means on said cross-head for engaging said pedestal to regulate the lower position of the post member and the tool assemblies carried thereby.

4. In an extrusion press having a billet container, an extrusion tool assembly including a die, die holder and back-up members supported in a tool container having longitudinal keyways on opposite sides thereof, and a trackway on which the tool assembly is axially movable between an operative location sealed against the billet container and an inoperative location outside the press, manipulating mechanism for the tool assembly comprising reciprocatory runout means associated with said trackway and extending outwardly from the discharge face of the tool assembly and operable to translate the tool assembly to said locations, selectively, a quick-release connector comprising slidably interengaging vertical shoulder members connecting said tool assembly and runout means for release by elevating the tool assembly, a dependingly mounted tool assembly-receiving and supporting cradle overlying said runout means at said inoperative location, movably supported for vertical and lateral movements with respect to said runout means and normally maintained at an elevation disposing said tool assembly on said trackway and accommodating its movement into and out of the cradle, said cradle including a pair of horizontal rail members immovably held in laterally spaced relation and in longitudinal alignment with said keyways on said tool container, said rail members and keyways cooperating to form a lifting and supporting connection between said cradle and said tool assembly solely in response to movement of the latter to said inoperative location, and separate power means operatively connected to said cradle for imparting said vertical and lateral movements thereto, at will, to disengage said tool assembly from said trackway and said runout means and move it to a position disposed laterally of said runout means, whereby said trackway is cleared for immediate reception of another preassembled tool assembly thereon in connected relation with said runout means for movement thereby to said operative location.

5. In an extrusion press having a billet container, an extrusion tool assembly including a die, die holder and back-up members supported in a tool container having longitudinal keyways on opposite sides thereof, and a trackway on which the tool assembly is axially movable between an operative location sealed against the billet container and an inoperative location outside the press, manipulating mechanism for the tool assembly comprising reciprocatory runout means associated with said trackway and extending outwardly from the discharge face of said tool assembly and operable to translate the tool assembly to said locations, selectively, a quick-release connector comprising slidably interengaging vertical shoulder members connecting said tool assembly and runout means for release by elevating the tool assembly, a tool assembly-receiving and supporting cradle overlying said runout means at said inoperative location and normally maintained at an elevation which disposes said tool assembly on said trackway and accommodates its movement into and out of the cradle, a pair of dependent arms immovably carried by said cradle in laterally spaced relation for movement of said tool assembly into and out of position therebetween, opposed, inwardly facing horizontal rail members carried by said arms in registry with said keyways and cooperating therewith to form a lifting and supporting connection for said tool assembly solely in response to its movement to said inoperative location, a second cradle provided with dependent arms and inwardly facing rail members carrying a second tool assembly, a horizontal member rigidly connecting said cradles and maintaining them in laterally spaced apart relation, and separate fluid pressure actuated piston and cylinder means operatively connected to said cradles through said horizontal member for moving them in unison upwardly and then laterally with respect to said runout means and then downwardly to said elevation, thereby to exchange one tool assembly for the other in connected relationship with said runout means for translation thereby into and out of the press, each tool assembly having a shoulder member for cooperation with the said shoulder member of said runout means.

References Cited in the file of this patent

UNITED STATES PATENTS

| | | |
|---|---|---|
| 1,393,580 | Schranz | Oct. 11, 1921 |
| 1,766,573 | Westin | June 24, 1930 |
| 1,935,739 | Freese | Nov. 21, 1933 |
| 1,947,202 | Homeier | Feb. 13, 1934 |
| 2,031,008 | Schwerak | Feb. 18, 1936 |
| 2,728,453 | Thweatt et al. | Dec. 27, 1955 |
| 2,830,700 | Kamena | Apr. 15, 1958 |
| 2,888,131 | Allen | May 26, 1959 |

FOREIGN PATENTS

| | | |
|---|---|---|
| 542,045 | Germany | Jan. 19, 1932 |
| 693,407 | Germany | July 11, 1940 |